(12) United States Patent
Partyka

(10) Patent No.: US 6,925,105 B1
(45) Date of Patent: Aug. 2, 2005

(54) OVERHEAD REDUCTION IN SYSTEM FOR INTERMITTENT TRANSMISSION

(76) Inventor: Andrzej Partyka, 370 Finch La., Bedminster, NJ (US) 07921

(*) Notice: Subject to any disclaimer, the term of this patent is extended or adjusted under 35 U.S.C. 154(b) by 0 days.

(21) Appl. No.: 09/562,152

(22) Filed: May 1, 2000

(51) Int. Cl.[7] .................................................. H04B 1/69
(52) U.S. Cl. ........................ 375/133; 375/135; 375/136; 375/138
(58) Field of Search ................................. 375/259, 132, 375/134, 201, 347, 299, 135, 136, 138, 146, 147, 295, 316, 131, 133; 340/10.3, 206, 870.03, 870.07, 870.11; 370/280, 436

(56) References Cited

U.S. PATENT DOCUMENTS

| | | | |
|---|---|---|---|
| 3,609,729 A | * | 9/1971 | Anderson .................... 340/206 |
| 4,040,054 A | | 8/1977 | Overman |
| 4,435,821 A | | 3/1984 | Ito et al. |
| 4,606,041 A | | 8/1986 | Kadin |
| 4,612,652 A | | 9/1986 | Kadin |
| 4,614,945 A | | 9/1986 | Brunius et al. |
| 4,653,068 A | | 3/1987 | Kadin |
| RE32,905 E | | 4/1989 | Baran |
| 4,843,638 A | | 6/1989 | Walters |
| 5,079,768 A | | 1/1992 | Flammer |
| 5,121,407 A | | 6/1992 | Partyka et al. |
| 5,121,408 A | | 6/1992 | Cai et al. |
| 5,204,855 A | | 4/1993 | Bebee et al. |
| 5,287,384 A | | 2/1994 | Avery et al. |
| 5,309,448 A | | 5/1994 | Bouloutas et al. |
| 5,390,166 A | | 2/1995 | Rohani et al. |
| 5,400,246 A | | 3/1995 | Wilson et al. |
| 5,408,506 A | | 4/1995 | Mincher et al. |
| 5,414,731 A | | 5/1995 | Antunes et al. |
| 5,428,602 A | | 6/1995 | Kemppainen |
| 5,428,637 A | * | 6/1995 | Oliva, Jr. et al. ........... 375/202 |
| 5,436,935 A | | 7/1995 | Bernhard et al. |
| 5,438,329 A | | 8/1995 | Gasouniotis et al. |
| 5,442,659 A | | 8/1995 | Bauchot et al. |
| 5,517,187 A | | 5/1996 | Bruwer et al. |
| 5,532,702 A | | 7/1996 | Mintz |
| 5,546,422 A | | 8/1996 | Yokev et al. |
| 5,548,582 A | | 8/1996 | Brajal et al. |
| 5,553,094 A | | 9/1996 | Johnson et al. |
| 5,586,141 A | | 12/1996 | Ashdown et al. |
| 5,595,342 A | | 1/1997 | McNair et al. |
| 5,610,907 A | | 3/1997 | Barret |
| 5,657,343 A | | 8/1997 | Schilling |
| 5,659,303 A | | 8/1997 | Adair, Jr. |
| 5,668,828 A | | 9/1997 | Sanderford, Jr. et al. |
| 5,748,100 A | | 5/1998 | Gutman et al. |
| 5,748,103 A | | 5/1998 | Flach et al. |

(Continued)

OTHER PUBLICATIONS

European Patent Application No. 0 629 098 A2—Bishop.

*Primary Examiner*—Young T. Tse
*Assistant Examiner*—Sam K. Ahn

(57) ABSTRACT

A radio transmission telemetry system includes many battery-operated radio transmitters to intermittently transmit very short messages indicative or status of sensors associated with the transmitters and a receiver to collect data from the sensors. The transmitters transmit very short messages separated by long time intervals independently of any receiver capable of receiving from any of the transmitters. Each transmitter varies the frequency for each transmission and the time between transmissions according to a sequence that is unique and based on the transmitter ID code. The receiver holds information about the expected time and the expected frequency of the future transmissions for each transmitter. The receiver identifies each source of transmissions based on its unique variations of the transmission time and frequency, thus eliminating the necessity to include any information about the transmitter ID code in the transmitted messages.

24 Claims, 9 Drawing Sheets

U.S. PATENT DOCUMENTS

| | | |
|---|---|---|
| 5,854,994 A | 12/1998 | Canada et al. |
| 5,937,002 A | 8/1999 | Anderson et al. |
| 5,956,621 A | 9/1999 | Weiss et al. |
| 5,960,047 A * | 9/1999 | Proctor, Jr. et al. .......... 375/347 |
| 6,018,528 A * | 1/2000 | Gitlin et al. ................. 370/436 |
| 6,058,137 A * | 5/2000 | Partyka ...................... 375/201 |
| 6,144,693 A | 11/2000 | Tabeta |
| 6,188,715 B1 * | 2/2001 | Partyka ...................... 375/134 |
| 6,195,018 B1 | 2/2001 | Ragle et al. |
| 6,222,440 B1 * | 4/2001 | Heller ....................... 340/10.3 |
| 6,223,048 B1 | 4/2001 | Noll Barreto et al. |
| 6,333,975 B1 | 12/2001 | Brunn et al. |
| 6,377,609 B1 | 4/2002 | Brennan, Jr. |
| 6,389,057 B1 | 5/2002 | Haartsen |
| 6,463,040 B1 * | 10/2002 | Dutta ......................... 370/280 |
| 6,466,138 B1 | 10/2002 | Partyka |
| 6,466,608 B1 | 10/2002 | Hong et al. |
| 6,535,544 B1 * | 3/2003 | Partyka ...................... 375/132 |
| 6,567,459 B1 | 5/2003 | Hakkinen et al. |
| 6,700,920 B1 | 3/2004 | Partyka |
| 6,728,293 B1 | 4/2004 | Partyka |
| 6,731,223 B1 | 5/2004 | Partyka |
| 6,760,319 B1 | 7/2004 | Gerten et al. |
| 6,778,521 B1 | 8/2004 | Korpela et al. |
| 2002/0027504 A1 | 3/2002 | Davis et al. |

* cited by examiner

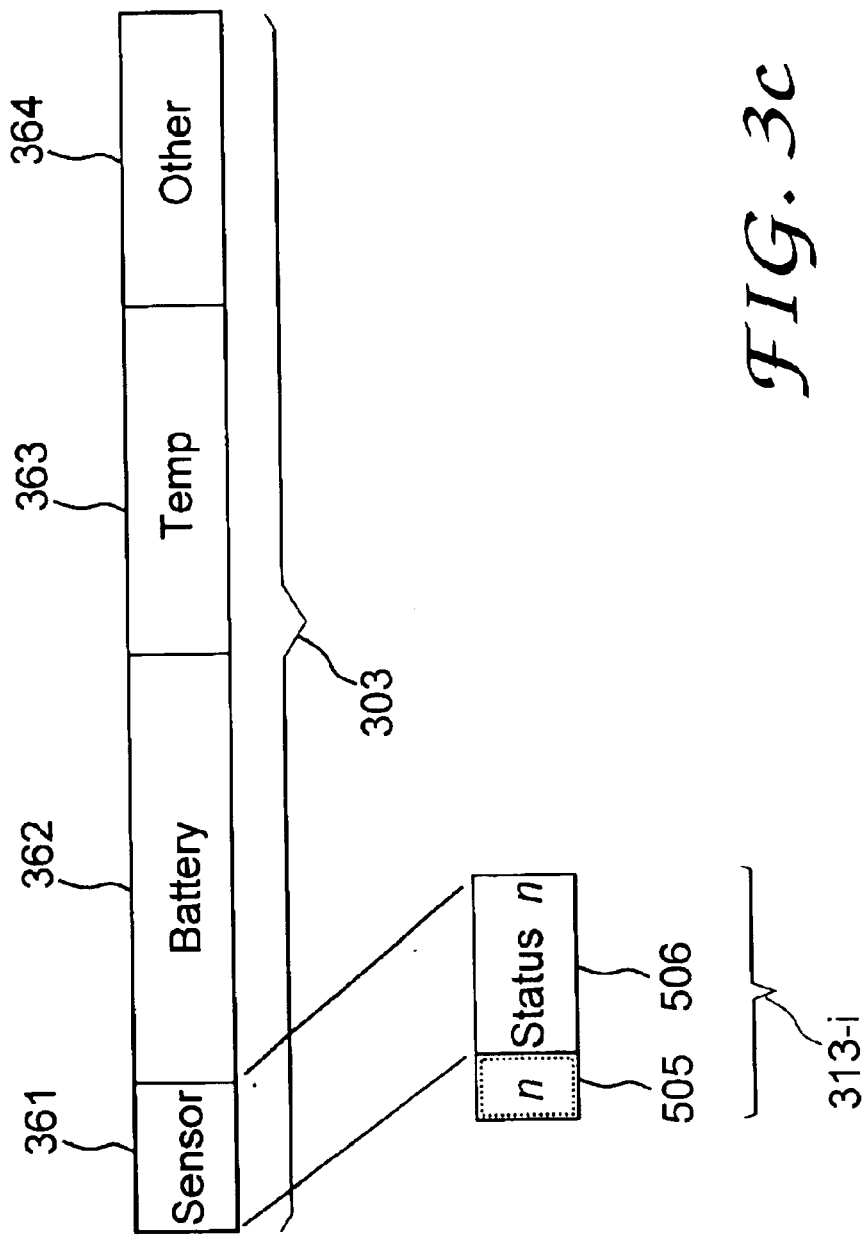

OVERHEAD REDUCTION IN SYSTEM FOR INTERMITTENT TRANSMISSION

FIELD OF THE INVENTION

The present invention relates to a system in which a plurality of transmitters wirelessly transmit data for collection by one or more receivers.

BACKGROUND OF THE INVENTION

Some wireless telemetry systems (e.g., burglar alarms, fire alarms, power utility meters, leak detectors, environmental monitoring, plant control, etc.) comprise many transmitters that intermittently (periodically or sporadically, at constant or varying time intervals) transmit messages to one or more receivers. In these systems, the transmitters are located at different places and transmit messages that are indicative of the status of monitoring sensors to a receiver that collects the data from all of the sensors. Normally, the transmitters transmit messages that are as short as feasible and with the interval between the transmissions as long as feasible. This is advantageous for two reasons. First, it minimizes the average current drain in the transmitters, which are typically battery operated. Second, short and infrequent transmissions lower the probability that the data is lost due to collisions that occur when two or more transmitters transmit at the same time.

In order that a receiver can discern which data comes from which transmitter, each transmitter has a transmitter identification number assigned to it. The transmitter identification number is included in each transmitted message in order to make it possible for the receiver to identify the source of each received message.

Preferably, the transmitter identification number is determined for each transmitter as a large and unique number in order to ensure uniqueness when many systems operate in vicinity such that one receiver can receive messages from transmitters from more than one system.

In order to avoid a complex and expensive management of the transmitter numbering depending on the geographical location of the installed systems to prevent such confusion, it is preferred to equip each manufactured transmitter with a unique number that is never repeated. Such a number can be very large (depending on the predicted total number of transmitters ever to be produced) and may require a large number of bits in the transmitted messages. In effect, a significant overhead in the transmission is created, which increases the transmitter average power consumption. In battery operated transmitters, this overhead shortens the life of the transmitter battery. In some transmitters the battery life may be shortened by half or even more, thus increasing system maintenance cost and lowering system functionality and reliability.

Typically, such systems transmit data at a single frequency, and thus are susceptible to interference and signal loss due to phenomena known as "multipath fading". Consequently, the reliability of such systems is compromised or, conversely, the transmitted power has to be increased to overcome the fading, which results in larger power drain and shorter battery life. Besides, there usually are regulatory limits that restrict such transmitter power and thus limit the possible compensation by sheer increase of power. Since the multipath effect is highly sensitive to the frequency of the transmitted carrier, a system using multiple frequencies (e.g., a frequency hopping spread spectrum system, etc.) has a potential to eliminate these drawbacks. However, frequency hopping systems require a long acquisition time and they are typically used in two way communication applications in which all the devices are continuously synchronizing with one master device or with each other using a variety of synchronization methods as shown in some references. In other cases, to ease the synchronization problem, there are employed receivers that can simultaneously receive signals at many frequencies by making the receiver broadband or by using several receivers at the same time. Generally, those solutions suffer from performance degradation or high cost or both, which makes them undesirable for low cost applications that require high reliability such as security systems and many other telemetry systems.

SUMMARY OF THE INVENTION

The illustrative embodiment of the present invention is a wireless telemetry system comprising: (1) several remote telemetry transmitters (transmitters) that intermittently transmit short duration messages indicative of the status of the sensors associated with the transmitters, and (2) at least one telemetry collection unit having a radio receiver (receiver) for receiving messages from all the remote telemetry transmitters.

In accordance with the illustrative embodiment of the present invention, each remote telemetry transmitter advantageously transmits short transmissions at relatively long time intervals and at varied frequencies, and each remote telemetry transmitter transmits independently of any receiver that is capable of receiving from any of the remote telemetry transmitters.

The radio receiver acquires and contemporaneously and continuously maintains synchronization with each of a plurality of transmitters. In accordance with the illustrative embodiment of the present invention, the receiver holds expected times and frequencies of future transmissions from each of the transmitters.

In accordance with the illustrative embodiment of the present invention, each transmitter partitions the transmitter identification (ID) code into several portions and includes, in each message, only one of the portions in such a way that several messages contain, in aggregate, the entire transmitter ID code. In effect, each transmitter transmits a train of short messages separated by long time intervals where each of the messages includes a portion of the transmitter ID code. In addition, the portions are numbered and appropriate information about which portion is included in a message is also embedded in the transmitted message. The time between transmission of messages is precisely controlled.

Including only a portion of the transmitter ID code in each message is advantageous since the message length can be significantly reduced, which results in lower average current drain and, consequently, longer battery life.

In accordance with the illustrative embodiment of the present invention, the receiver discerns each of the message trains, which are from various transmitters, based on coincidence of actual and expected times and frequencies of the transmissions for each train. I.e., if a message was received at an expected time and frequency for a certain train of messages, the receiver can reasonably conclude that this message is, in fact, a part of this train. Such conclusion is fair if the transmissions from different transmitters rarely coincide.

In accordance with the illustrative embodiment of the present invention, the receiver, then, aggregates portions of the transmitter ID code separately for each message train to identify or verify ID code of the transmitter producing the message train. Thus, the receiver does not need the entire transmitter ID code in each transmitted message in order to identify the source of transmissions.

Although it has been indicated that the receiver uses the expected time and frequency as the basis of discerning the origin of each message, it should be understood that the criterion of the expected frequency may not be necessary for correct operation especially when all the messages are transmitted at a single frequency. However, it is advantageous to use more than one frequency in such a system, and, in such a case, it is also advantageous to include the frequency criterion.

In accordance with the illustrative embodiment of the present invention, the wireless telemetry system uses frequency hopping for wireless transmission. Accordingly, the transmitters intermittently transmit very short messages indicative of status of the sensors associated with the transmitters. Each transmitter includes a time interval generator to establish the time interval between successive transmissions, a frequency synthesizer-modulator to generate a modulated radio frequency carrier signal wherein the frequency of the carrier changes in response to programming the synthesizer by digital data, a reference frequency oscillator to provide a frequency reference from which the synthesizer derives carrier frequencies and, advantageously, from which the time interval generator derives its timing, and a transmitter control logic activated in response to pulses from the time interval generator or a sensor signal indicating an abnormal condition. When activated, the transmitter control logic activates and programs the synthesizer so that the transmitter carrier frequency is changed according to a frequency hopping algorithm, provides digital data indicative of the sensor status and, advantageously, battery status, and modulates the carrier with the provided data.

In accordance with the illustrative embodiment of the present invention, each transmitter selects a portion of the transmitter ID code for each transmission, and the selection is based on the frequency hopping algorithm. This is advantageous because the receiver can identify which portion of the transmitter ID code is included in each message without additional information embedded in the transmitted messages.

In accordance with the illustrative embodiment of the present invention, the receiver includes a frequency selective radio receiver circuit, programmable by digital data, to receive and demodulate a transmitted carrier when the frequency of the receiver circuit is programmed according to the frequency of the carrier, and a receiver control logic to process demodulated data, to provide system interface responsive to the received messages, and to program the frequency of the frequency selective receiver circuit. The control logic includes a receiver timer to measure the elapsing time, and a plurality of memory registers to hold digital data indicative of (a) the time of the next transmission occurrence for each transmitter and (b) the frequency of the next transmission occurrence for each transmitter. In operation, the control logic sequentially compares the data content of the time registers with the data content of the timer and if the transmission is due from a transmitter, the control logic programs the frequency selective radio receiver circuit according to the data content in the frequency register associated with this transmitter, attempts to decode the demodulated signal, modifies the content of the time register by a number representative of the time interval between the successive transmissions for this transmitter and modifies the content of the frequency register according to a predetermined algorithm for this transmitter.

In accordance with the illustrative embodiment of the present invention there is provided a method of transmission in the system to improve reliability of the system in the presence of multipath fading and interference, the method is based on varying the transmission frequency from one transmitted message to the next and varying the time between consecutive messages. The frequency variations provide frequency diversity and are effective against multipath fading as well as single of multiple narrowband interference. The time variations are effective against periodic impulse interference. In combination, the frequency and time variations provide immunity for a wide variety of signal impairments and interference including multipath fading, wide and narrowband interference, impulse noise and deliberate jamming.

In accordance with the illustrative embodiment of the present invention there is provided a method of minimizing the effect of collisions, the method is based on using the transmission frequencies in sequences that are different for each transmitter, wherein transmitter frequency sequence depends on the transmitter ID code or a sequence selecting number derived or associated with the transmitter ID code.

In accordance with the illustrative embodiment of the present invention there is provided another method of minimizing the effect of collisions, the method comprising varying the time interval between transmissions individually for each transmitter and a receiver compensating for the time interval changes. The time interval variation is based on a sequence that is different for each transmitter and that depends on the transmitter ID code or a sequence selecting number derived or associated with the transmitter ID code. This method can be used alone or in conjunction with the method of individual frequency variations as described earlier.

In accordance with the illustrative embodiment of the present invention, each transmitter transmits messages using either frequency or time or, more generally, frequency-time hopping sequence that is unique for each transmitter and without any transmitter ID information bits included in the messages. Such frequency-time hopping sequence may be in any combination of time and frequency variability, including: (a) a fixed frequency pattern for all transmitters and individual time perturbation patterns for each transmitter, (b) a fixed time interval between transmission or fixed time perturbation pattern and individual pattern for frequency selection for each transmitter, and (c) individual frequency and time variations that can be combined to enhance the system performance at the expense of complication.

For each transmitter, the frequency-time hopping sequence is based on the transmitter ID code or equivalently on a sequence selecting number that can be derived from the transmitter ID code, or that is associated with the transmitter ID code. Thus, the frequency-time hopping pattern identifies the transmitter. The receiver is furnished with the list of the ID codes of all the transmitters to be monitored or equivalently and in addition the receiver is furnished with a list of the sequence selecting numbers. Based on the available ID codes or the sequence selecting numbers, the receiver can reconstruct the frequency-time hopping sequences for each transmitter. The receiver identifies the source of the transmission by comparing the actual frequency-time hopping transmission pattern with the reconstructed patterns. In addition, the transmitter may include in the transmitted messages: (a) portions of the transmitter ID code, (b) the status of the sequence generator. In such cases, the receiver is aided in synchronization and identification of the transmitter at the expense of slight increase in the message length. Of course, the inclusions can be made in every message or only in selected messages.

In accordance with the illustrative embodiment of the present invention there is provided a simple method to generate a very large number of frequency-time hopping sequences. The method produces sequences that are orthogonal, i.e., if transmissions from any two transmitters coincided in time and frequency, they would not coincide again for the entire duration of the sequence, thus possibility of persistent collisions is eliminated even when large number of transmitters are used. In addition, the method requires identical circuit in each transmitter and the actual sequence that is produced is selected by the transmitter ID code or other number associated with the transmitter ID code, thus making it convenient for manufacturing. Also, the method provides the means for producing a very large number of frequency-time sequences based on a single short PN generator whose state can be instantly recovered by a receiver based on just one received transmission, thus aiding the receiver in obtaining synchronization with a transmitter whose ID is known. At the same time, because of a very large number of possible sequences that can be generated, it is difficult to obtain synchronization if the transmitter ID code is not known, which makes the system immune to interception and jamming.

In accordance with the illustrative embodiment of the present invention, each transmitter selects a portion of the transmitter ID code for each transmission, and the selection is based on the state of the PN generator used for producing the frequency-time hopping sequence. This is advantageous because the receiver can identify which portion of the ID is included in each message without additional information embedded in the transmitted messages.

In accordance with the illustrative embodiment of the present invention, the message length is further reduced by similar segmentation process of the status information bits. This is especially beneficial when the status information includes several values such as sensor value, battery value, temperature value and other values that together use a significant percentage of the message bits. In accordance with the illustrative embodiment of the present invention, the segmentation may include some parts of the status information to be sent more often than some other parts of the status information. This is advantageous in further reducing the average message length.

These and other, advantages and features of this invention will be apparent from the following detailed description of the illustrative embodiment that is to be read in connection with the accompanying drawings.

BRIEF DESCRIPTION OF THE DRAWINGS

FIG. 3c is a diagram of status information segmentation according to an advantageous embodiment of the present invention.

DETAILED DESCRIPTION

Figure 1:
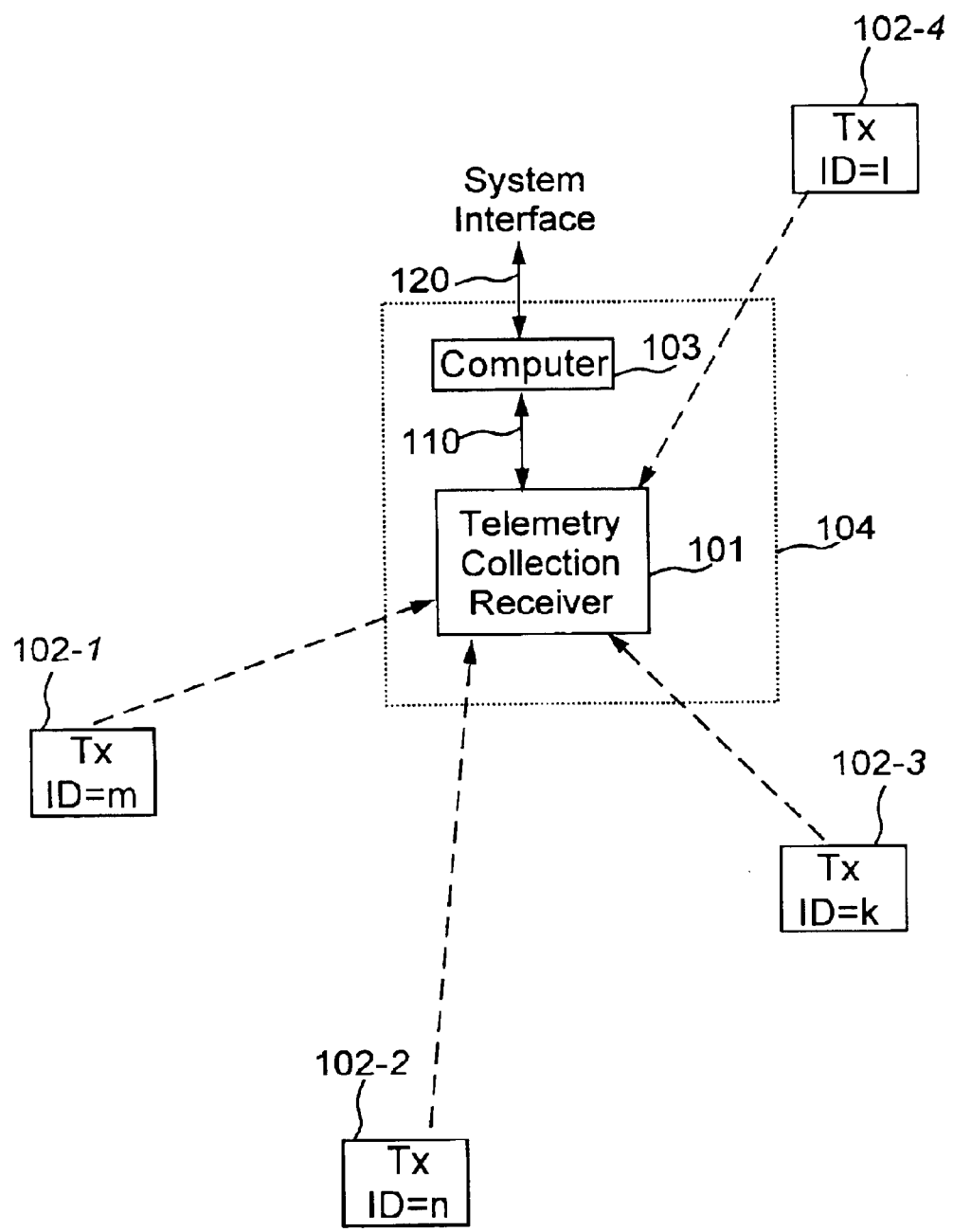
FIG. 1 is a diagram of a typical telemetry system.

Referring to FIG. 1, the frequency hopping system includes a telemetry collection unit 104 and a plurality of remote telemetry transmitters (transmitters) 102-1, 102-2, 102-3 and 102-4. The telemetry collection unit includes a telemetry collection receiver (receiver) 101, and a computer 103 that can communicate the telemetry over system interface 120. The receiver 101 includes a system interface 110 through which the receiver can be connected, locally or remotely, to a variety of interface equipment, a controller, or a computer. Each remote telemetry transmitter includes an interface or a sensor or an operation to be monitored. Each remote telemetry transmitter intermittently transmits short messages to the telemetry collection receiver. The remote telemetry transmitters are not connected to each other and do not receive messages back from the telemetry collection receiver. The remote telemetry transmitters transmit messages when they need to without any regard to other remote telemetry transmitters, as the remote telemetry transmitters are not synchronized with each other. Each remote telemetry transmitter comprises a transmitter identification (ID) code.

Figure 2A:
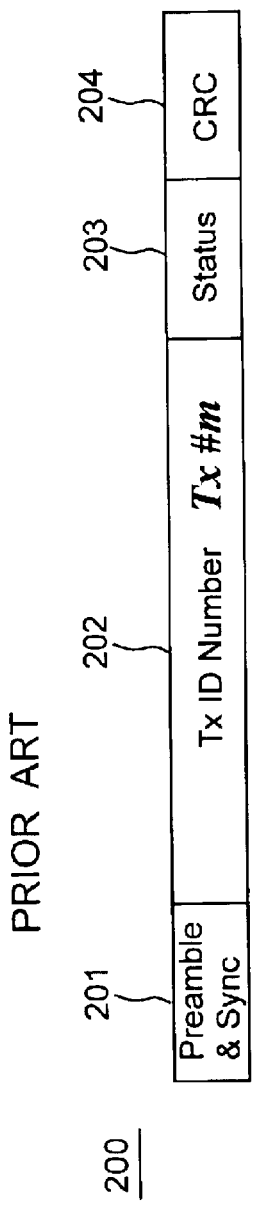
FIG. 2a is a diagram of a typical telemetry message structure according to prior art.

Referring to FIG. 2a, according to prior art, a typical message 200 consists of preamble and synchronization bits 201, transmitter ID code bits 202, status bits 203, and cyclic redundancy check (CRC) bits—204 used to detect errors in the transmitted message. The preamble bits are used by the receiver for carrier frequency and phase acquisition and bit timing acquisition. The synchronization bits are used to detect the beginning of the message. The status bits may include several information segments: sensor, battery, temperature and others depending on the application needs. For example, the internal state of the PN generator used to affect the remote telemetry transmitter frequency as described later can be also included. The sensor status can be as little as one bit or it can be 16 bits or more, the battery status can be also from one bit to 8 or more bits depending on the application needs. The CRC bits may include error detection bits as well as error correction bits if desired. The transmitter ID code is typically at least 16 bit long but it can be 32 bit long or even longer.

Figure 2B:
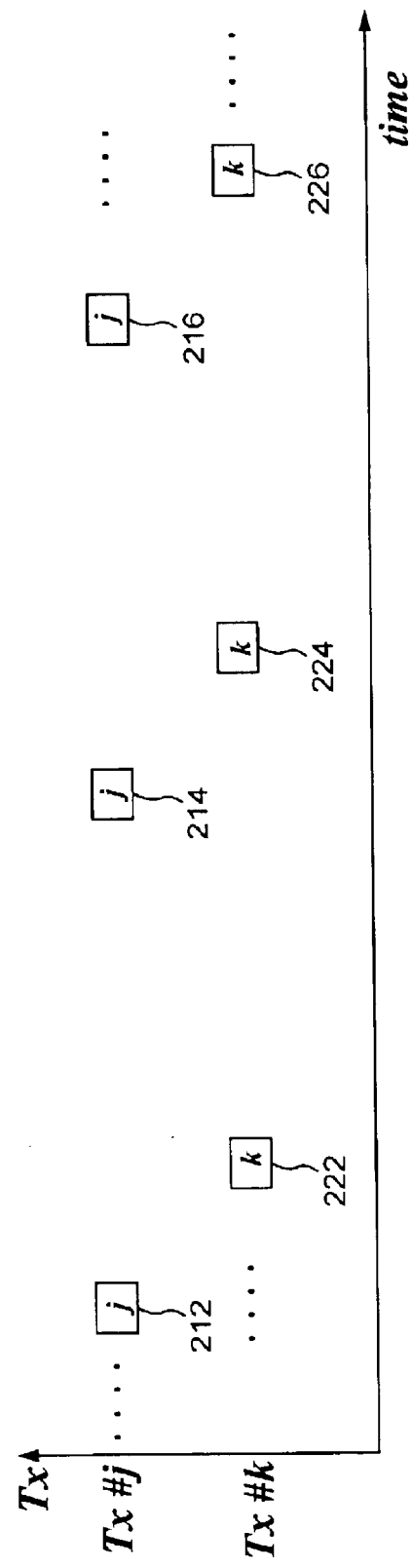
FIG. 2b is a diagram of telemetry transmissions according to prior art.

Referring to FIG. 2b, according to prior art, transmitters transmit messages at intervals and each transmitted message includes a transmitter ID code. For example, the transmitter with ID code j transmits messages 212, 214, 216, etc., that are at nominally equal intervals and each includes the transmitter ID code j. Similarly, another transmitter with ID code k transmits messages 222, 224, 226, etc., that are at nominally equal intervals and each includes the transmitter ID code k.

Figure 3A:
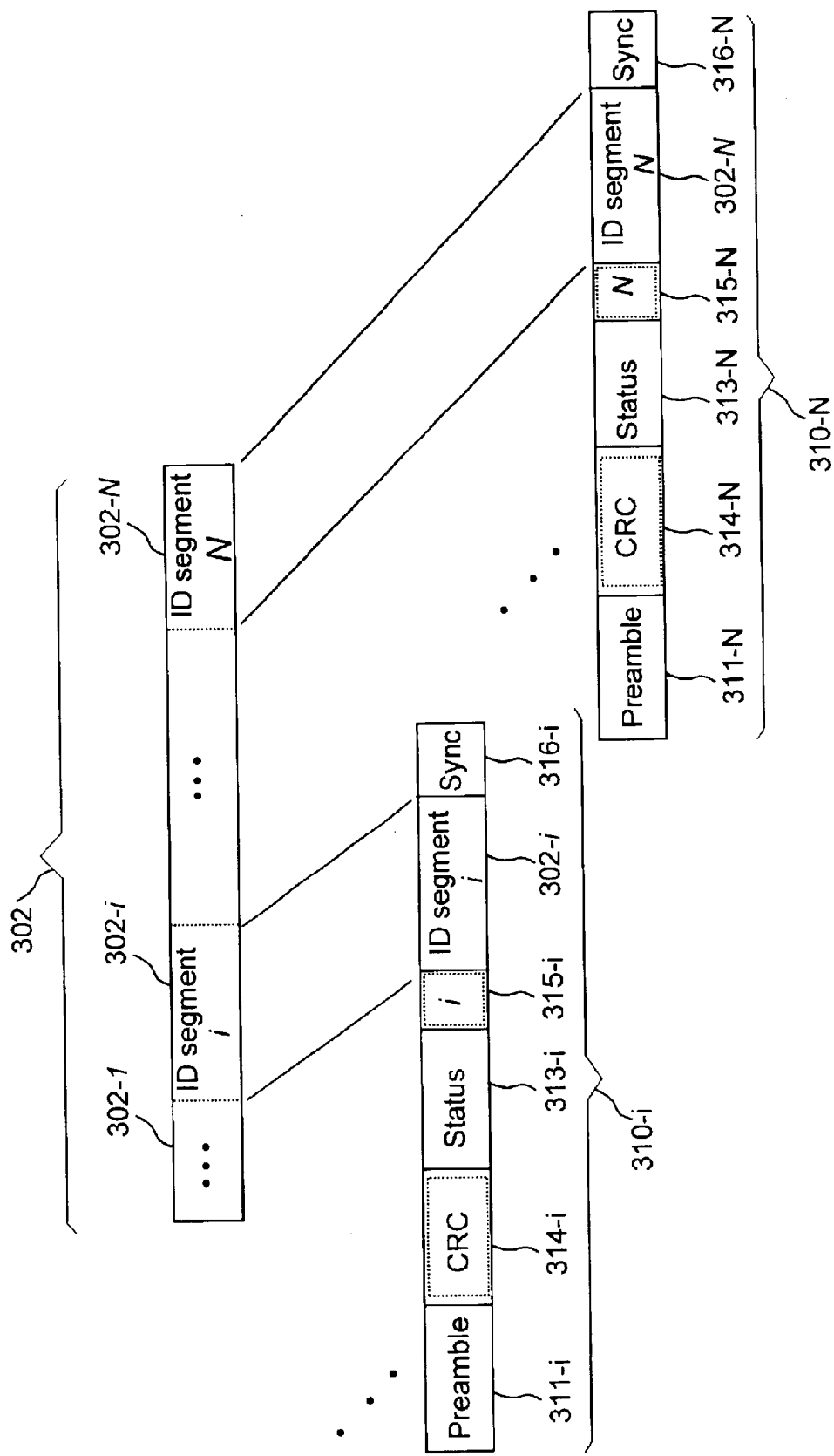
FIG. 3a is a diagram of a typical telemetry message structure including segmented transmitter ID code according to an advantageous embodiment of the present invention.

Referring to FIG. 3a, according to an advantageous embodiment of the present invention, the transmitter ID code 302 is divided into portions 302-1 through 302-N. These portions are included, one at the time, in the transmitted messages 310-1 thorough 310-N, of which only messages 310-1 and 310-N are shown.

According to an advantageous embodiment of the present invention, each transmitted message includes only a single portion of the transmitter ID code. Furthermore, a different portion is selected for each consecutive transmission according to a predetermined algorithm. Advantageously, all N segments are transmitted in N consecutive transmissions.

Advantageously, some embodiments of the present invention include in a transmitted message a number indicative of which portion is included in the message. E.g. message 310-$i$ may include number 315-$i$, and message 310-N may include number 315-N.

Figure 3B:
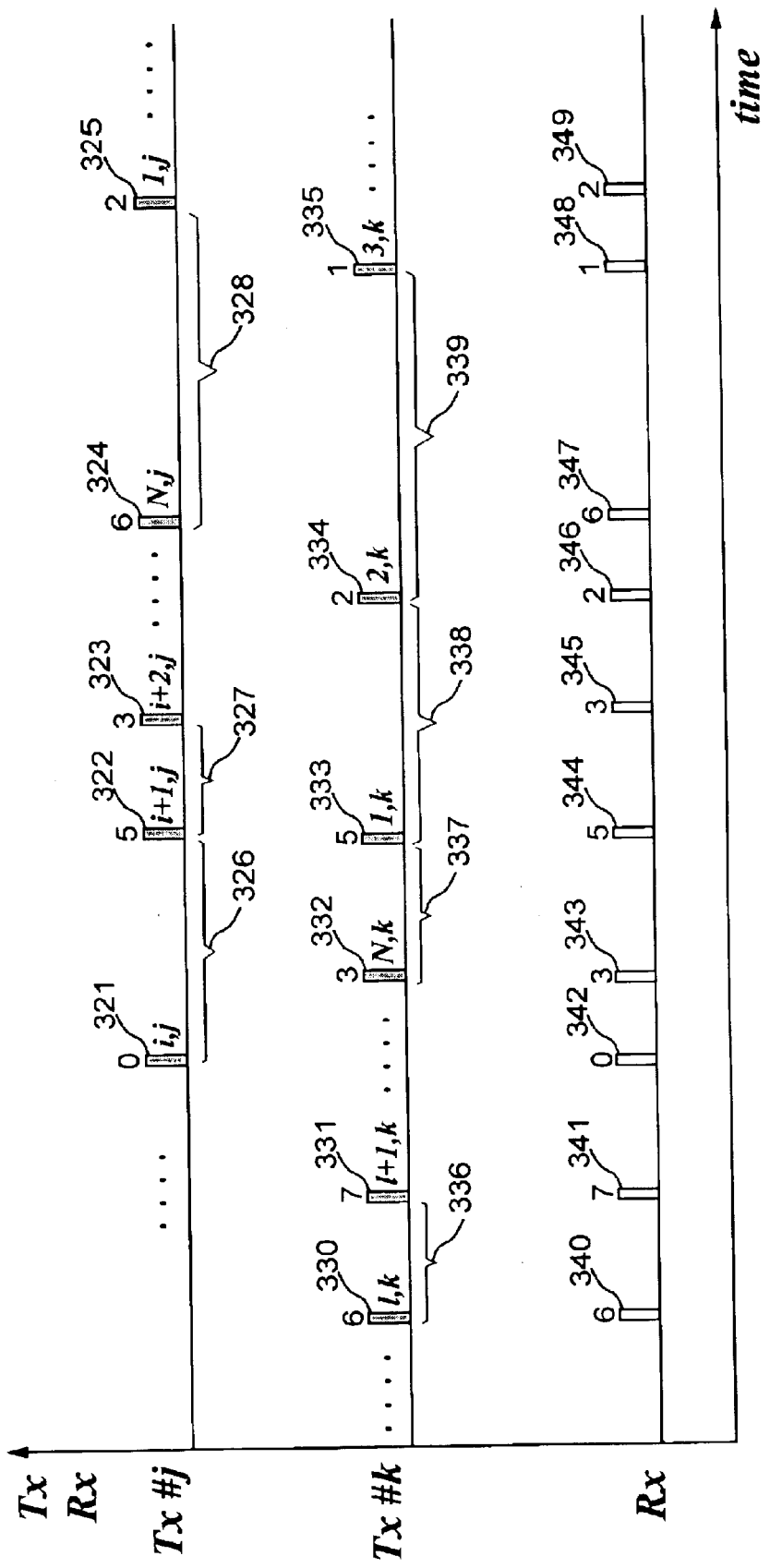
FIG. 3b is a diagram of telemetry transmissions according to an advantageous embodiment of the present invention.

According to an advantageous embodiment of the present invention, the transmitted messages are constructed to minimize the transmission overhead. Referring further to FIG. 3$a$, message 310-$i$ includes preamble 311-$i$, status 313-$i$, ID segment 302-$i$ and synchronization bits 316-$i$. Similarly, message 310-N includes preamble 311-N, status 313-N, ID segment 302-N and synchronization bits 316-N. In addition, according to some embodiments of the present invention the messages may include CRC bits 314-$i$ and 314-N respectively.

According to another advantageous variation of an embodiment of the present invention, each transmission comprises a part of the transmitter ID code, wherein some or all of the parts may be, advantageously, partially overlapping. I.e. some bits of the transmitter ID code may be repeated in a subsequent transmission. This may aid the receiver in verification that the parts belong to the same transmitter ID code.

FIG. 3$b$ shows transmissions of messages form two transmitters according to an advantageous embodiment of the present invention. The transmitter with ID code j transmits a train of messages of which messages 321, 322, 323, 324, and 325 are shown. Similarly, transmitter with ID code k transmits a train of messages of which messages 330, 331, 332, 333, 334, and 335 are shown. According to advantageous embodiment of the present invention, the messages are transmitted at varied frequencies and at varied time intervals and each message includes a portion of the transmitter ID code. Each frequency is designated according to an index assigned for each transmission. For example, message 321, 322, 323, 324 and 325 are transmitted at frequencies with indexes 0, 5, 3, 6, and 2 respectively. Similarly, messages 330, 331, 332, 333, 334, and 335 are transmitted at frequencies with indexes 6, 7, 3, 5, 2, 1 respectively. According to advantageous embodiment of the present invention, the method of selection the frequency indexes is individual for each transmitter and is based on algorithm described later in details. Similarly, according to advantageous embodiment of the present invention the intervals between consecutive transmissions are varied. For example, intervals 326, 327 between transmissions 321, 322 and 323 and interval 328 between transmissions 324 and 325 respectively are shown to be different. Similarly, the intervals 337, 338, and 339 between transmissions 332, 333, 334, and 335 and the interval between transmissions 330 and 331 respectively are shown to be different. According to advantageous embodiment of the present invention, the method of determining the intervals between transmissions is individual for each transmitter and is based on algorithm described later in details.

According to advantageous embodiment of the present invention, each transmission includes a portion of the transmitter ID code. For example, transmission 321 includes portion i of ID j, transmission 322 includes portion i+1 of ID j, transmission 323 includes portion i+2 of ID j, transmission 324 includes portion N of ID j, and transmission 325 includes portion 1 of ID j. Similarly, transmission 330 includes portion 1 of ID k, etc.

According to advantageous embodiment of the present invention, the receiver tunes at appropriate time to appropriate frequency to receive messages from each transmitter. For example, the receiver tunes to frequency 6 during time window 340 to receive message 330, then, the receiver tunes to frequency 7 during time window 341 to receive message 331, then, the receiver tunes to frequency 0 during time window 342 to receiver message 321, etc. Note that message 322 from transmitter j and message 344 from transmitter k coincide in time (partially overlap). The receiver arbitrates and selects one frequency. If the frequencies also coincide, one or both messages will be lost.

FIG. 3$c$ shows status information bits 303 subjected to segmentation process similar to that used to partition the ID code. Accordingly, status 303 is divided into several parts of which sensor status 361, battery status 362, temperature 363 are shown. Other status information may also be included depending on the application needs. According to advantageous embodiment of the present invention, the status information that is to be transmitted is divided into several parts. Each transmitted message can contain one or more of the status parts. Advantageously, status 313-$i$ developed in this way may also include the status segment indicator 505 in addition to the status information part to be transmitted 506.

Figure 4:
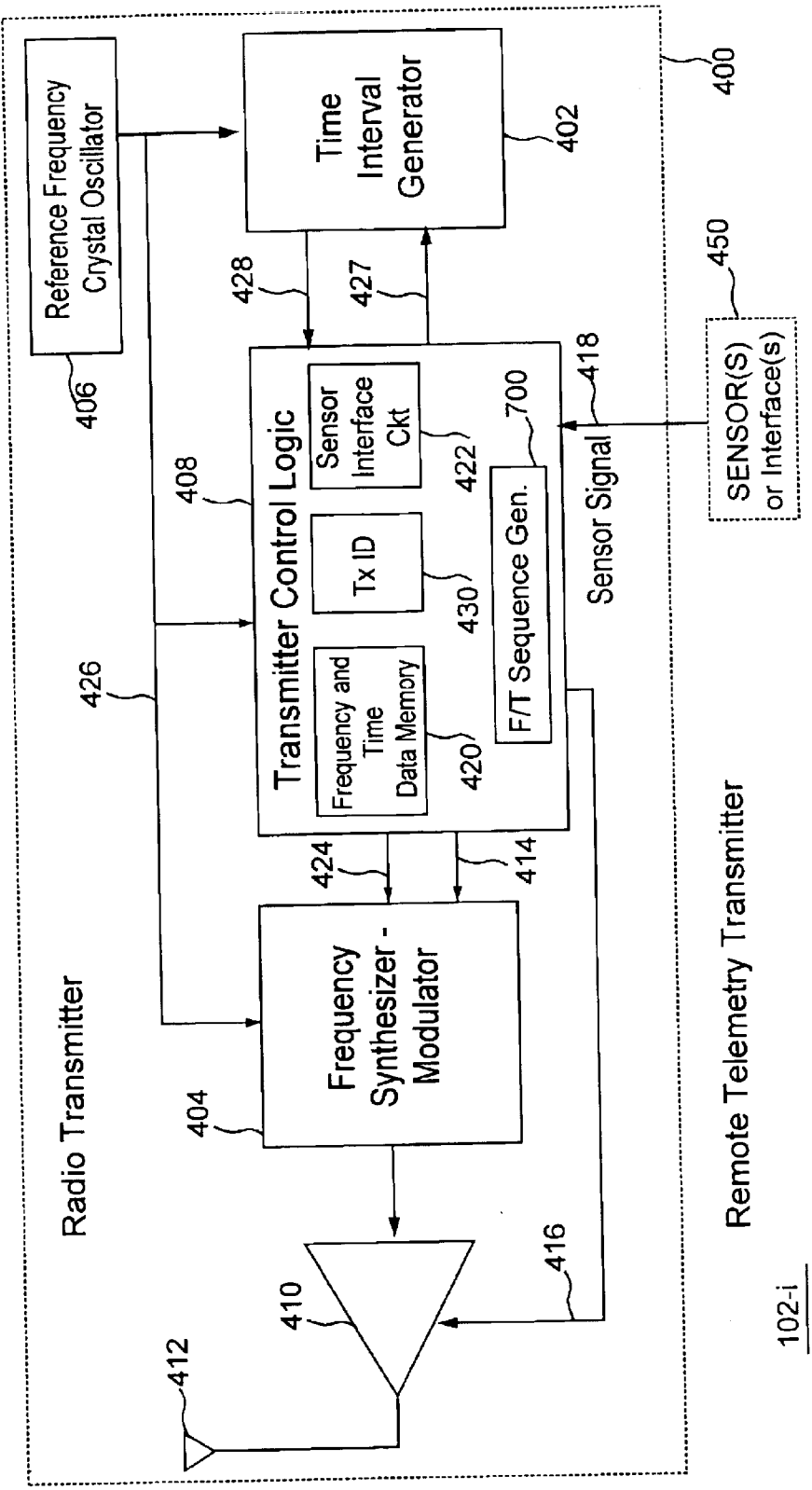
FIG. 4 is a diagram of a remote telemetry transmitter according to an advantageous embodiment of the present invention.

Referring to FIG. 4, in accordance with the illustrative embodiment of the present invention, the remote telemetry transmitter 102-$i$ includes a radio transmitter (transmitter) 400 including a reference frequency crystal oscillator 406 to produce a stable frequency on line 426, a time interval generator 402 establishing a time base to produce pulses on line 428 activating the transmitter, a frequency synthesizer-modulator circuit 404 to produce a radio frequency carrier modulated by modulation data fed to the synthesizer via line 424 wherein the frequency of the carrier can be varied by programming to a desired value via plurality of lines 414, transmitter control logic 408 to activate and program the synthesizer-modulator circuit 404 via plurality of lines 414 when the logic is activated by a pulse from the time interval generator or by an abnormal signal indication on a sensor signal input line 418, an amplifier 410 to amplify the radio carrier provided by the synthesizer when the amplifier is activated by the control logic 408 via line 416, and an antenna 412 to radiate the power delivered by the amplifier. The control logic 408 includes a frequency and time data memory register 420 to hold information used to determine the time and the frequency of next transmission, and a sensor interface circuit 422 to accept the sensor signal and detect an abnormal signal condition, and to convert the sensor signal to a digital format suitable for transmission. The transmitter logic also includes a storage means 430 to store a transmitter identification number to differentiate this transmitter from other transmitters. The transmitter control logic, in some systems, can be realized based on a microprocessor, in some other systems, a specialized component may be used. In the illustrative implementation, the remote telemetry transmitter includes also one or more sensors or sensor interfaces 450 responsive to changes that are to be monitored and to produce appropriate signals at the interface 418. However, it should be apparent that such sensor can be an integral part of the transmitter or it can be external part or even a separate module. Furthermore, a part of the sensor may be integrated with the transmitter and another part of the sensor can be external to the transmitter. The input 105$i$ can be any measured or sensed effect: e.g., temperature, motion, sound, pressure, switch closure, presence of chemical substance, user input, etc.

In operation, during the time between transmissions, the transmitter is in a standby mode in which the amplifier 410 and synthesizer-modulator 404 are not active and, preferably, the control signals turn off the power from these circuits in order to minimize the standby current of the transmitter. The transmitter control logic 408 is in a standby mode in which most of the circuits are inactive and some or most of the circuitry can be powered down with the exception of the circuits supporting critical functions; (a) the sensor interface circuit 422 that detects an abnormal signal condition and produces a binary signal that is logically combined with the signal 428 produced by the time interval generator so that when either a pulse or abnormal condition occurs the rest of the transmit logic circuitry is activated or powered up, (b) the frequency and time data memory 420 that has to retain the data during the period between transmission and consequently either it has to be a nonvolatile type or it has to be powered up during the period between transmissions. Upon activation, the control logic 408 determines the activation source by reading signals 428 and 418.

When the logic 408 is activated by a pulse 428 from the time interval generator the following sequence of events occurs. First, the logic reads the frequency data memory and produces a data packet that includes the sensor status, the transmitter identification number and other data such as battery status. Then, the logic activates and programs the synthesizer-modulator circuit 404, activates the amplifier 410 and sends the packet to the modulator via line 424. After completion of each transmission, the transmitter logic sets the transmitter in the standby mode until activated again by a pulse on line 428 or a sensor abnormal condition indicated on line 418.

In an advantageous embodiment the transmission of a packet can be repeated a predetermined number of times at separate frequencies, wherein the number of repetitions is chosen according to application needs and, wherein the frequencies are determined by the transmitter logic according to an algorithm described later in details. This way, it is possible for the receiver to receive some repeated packets even if other packets are lost due to frequency selective fading caused by multipath or due to interference.

When a sensor abnormal condition occurs, the sensor interface circuit 422 produces an active level of the signal indicative of the sensor abnormal level which activates the transmitter via a combinatorial logic circuit that combines the sensor abnormal level signal with the pulses from the time interval generator. When activated this way, the transmitter control logic 408 produces a data packet that includes the sensor status, then the logic activates and programs the synthesizer-modulator circuit 404, activates the amplifier 410, and sends the packet to the synthesizer-modulator. The transmission may be repeated many times and the frequency for each transmission may be varied.

After the transmission sequence is completed, the control logic disables the signal indicative of the sensor abnormal status so that an abnormal sensor status can not activate the control logic. Then, the control logic puts the transmitter in the standby mode until activated by a pulse from the time interval generator. When subsequently activated, the transmitter control logic performs the usual transmission sequence but the data packets include information that the sensor condition is abnormal if the condition persists. When the abnormal condition subsides, the signal indicative of an abnormal status is enabled so that a subsequent occurrence of an abnormal condition can activate the logic and trigger a new alarm transmission sequence; thus, normal operation is restored.

In an advantageous embodiment, the sequence in which these frequencies are used is determined individually for each transmitter. The following is the description how this is accomplished in an advantageous embodiment. Each transmitter includes a pseudo random sequence generator, wherein a pseudo random sequence generator is based on a linear feedback shift register, wherein some outputs of the shift register are fed back to an EX-OR (Exclusive OR) gate whose output is connected to the register input. For a certain combination of the outputs that are fed to the EX-OR gate, the shift register can produce a sequence that has $2^N-1$ bits, wherein N is the length of the shift register. Such a sequence is called a maximum length sequence. Alternatively, if all the outputs of the shift register are taken at a time, then a pseudo random sequence of $2^N-1$ numbers is created, wherein all the numbers are N digits long and each number differs from all the other numbers in the sequence; the numbers range from 1 to $2^N-1$. Such pseudo random generators are known to the skilled in the art. For example, a three-bit PN generator is based on a three-bit shift register with feedback taken from the first and the last bit. This register produces a repetitive sequence of seven numbers, wherein each number has three digits. The numbers change from 1 to 7. The sequence repeats indefinitely with a period $2^N-1$.

Figure 6:
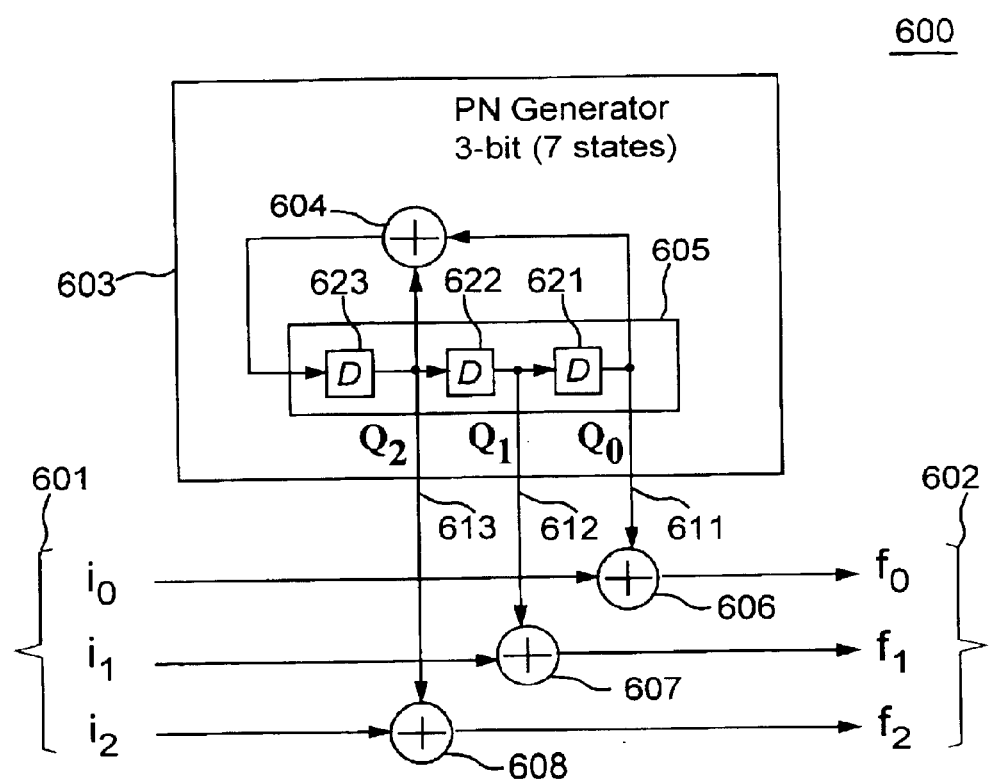
FIG. 6 is a diagram of a PN sequence generator that can be used to affect transmission frequency or time.

Referring to FIG. 6, the sequence generator 600 that can be used for determining frequency hopping comprises pseudo random sequence (PN) generator 603 and sequence permutation logic including EX-OR gates 606, 607 and 608, and sequence selecting number input 601 and hoping sequence output 602.

The pseudo random sequence generator 603 includes of a shift register 605 and EX-OR gate 604. The shift register 605 is composed of three stages 621, 622, and 623 having three outputs $Q_0$ 611, $Q_1$ 612 and $Q_2$ 613 respectively. The feedback is taken from outputs $Q_0$ and $Q_2$. The three least significant bits of the transmitter identification $\{i_2, i_1, i_0\}$ 601 are combined with the output of the pseudo random sequence generator $\{Q_2, Q_1, Q_0\}$ using EX-OR gates 608, 607, 606. The result can be used to indicate the frequency or frequency channel index $\{f_2, f_1, f_0\}$ 602 over which the transmission will occur.

Assuming that the initial state of the shift register is binary 111 (decimal 7), the produced sequence is {7, 3, 5, 2, 1, 4, 6}. These numbers are then combined with the last three bits of the transmitter identification using bit by bit EX-OR operation; i.e. the last bit of the transmitter identification ($i_0$) is combined with the last bit of the random number ($Q_0$), etc. This way produced new sequence has numbers ranging from 0 to 7 the order of which depends on the last three bits of the transmitter identification. Thus, 8 distinct (permuted) sequences of numbers are created. These sequences are used to select the transmission frequencies. For example, if the last digits of the transmitter identification are 000, then the frequencies are selected in the order 7, 3, 5, 2, 1, 4, 6, i.e. the sequence is not altered. If the last three digits of the transmitter identification are 001, then the frequencies are selected in the order 6, 2, 4, 3, 0, 5, 7; if the last three digits of the transmitter identification are 010, then the frequencies are selected in the order 5, 1, 7, 0, 3, 6, 4; etc.

Note that, each such sequence repeats cyclically as the PN generator output repeats with a period $2^N-1$. The notation {7, 3, 5, 2, 1, 4, 6} means that the sequence of numbers as indicated is cyclically repeated.

Notice, that one number is converted into "0" in the process of combining PN generator output with transmitter ID number thus, strictly speaking, the new sequences are not permutations of the original sequence. However, for the purpose of this application, this process is referred to as "permutation" and the resulting sequences as "permuted" as a convenient and adequate description. Notice also, that because of the conversion to "0" that occurs for all except 000 permuting bits (transmitter identification bits), the sequences collectively use $_2N$ numbers (frequencies) not $2^N-1$.

If a longer shift register is used, longer sequences are generated using more frequencies. The sequence length increases exponentially with the increase of the shift register length. For example if the register length is 2-bits, the sequence length is $2^2-1=3$, e.g. the sequence is $\{1, 2, 3\}$ before permutation with the transmitter 1) bits; if the register length is three the sequence length is $2^3-1=7$ as shown above, etc. Preferably, at least 100 frequencies are used as this is required by Federal Communications Commission to operate in certain frequency bands without a license. In the preferred embodiment, an 8 bit shift is used to produce sequences that use 256 distinct frequencies. Each number in the sequence actually represents an index based on which the actual frequency is determined. Notice, that each number in the sequence is different, i.e. each time the shift register state is changed, the resulting output number is also changed (regardless of the permuting bits used). Thus each sequence has as many variations as it has numbers. For the purpose of this application a "variation" is defined as a value change of two consecutive numbers in a sequence, e.g. sequence $\{1, 2, 3\}$ has three variations: 1 to 2, 2 to 3, and 3 to 1.

Normally, the time intervals between transmissions are controlled by a quartz crystal and, ideally their nominal values are the same for all transmitters, however in an advantageous embodiment, the time intervals are perturbed by small time increments to further randomize the transmission events and lower the probability of persistent collisions with other transmitters as well as avoiding an intentional or unintentional pulsed interference. The transmitter control logic 408 can accomplish this by programming the time interval generator 402 via line 427 (FIG. 4) according to a predetermined algorithm. The information about the current status of the algorithm may be included in the transmitted packet to aid the receiver operation.

In an advantageous embodiment, the method of determining the time interval perturbation is based on a similar technique as described in conjunction with the frequency index generation. I.e., each time a transmission is performed, a new number is generated and used to determine the time interval between the current and the next transmission. The time variations can be determined by processing the output of the PN generator used for the frequency index with bits of the transmitter ID code (preferably different from the bits used for frequency variations). Advantageously, the same PN generator outputs are utilized, thus making it easier to synchronize the receiver with the time variations.

However, according to an advantageous embodiment of the present invention, the following method is used that not only provides for the time and frequency variations but also provides a great number of orthogonal frequency-time hopping sequences.

Figure 7:
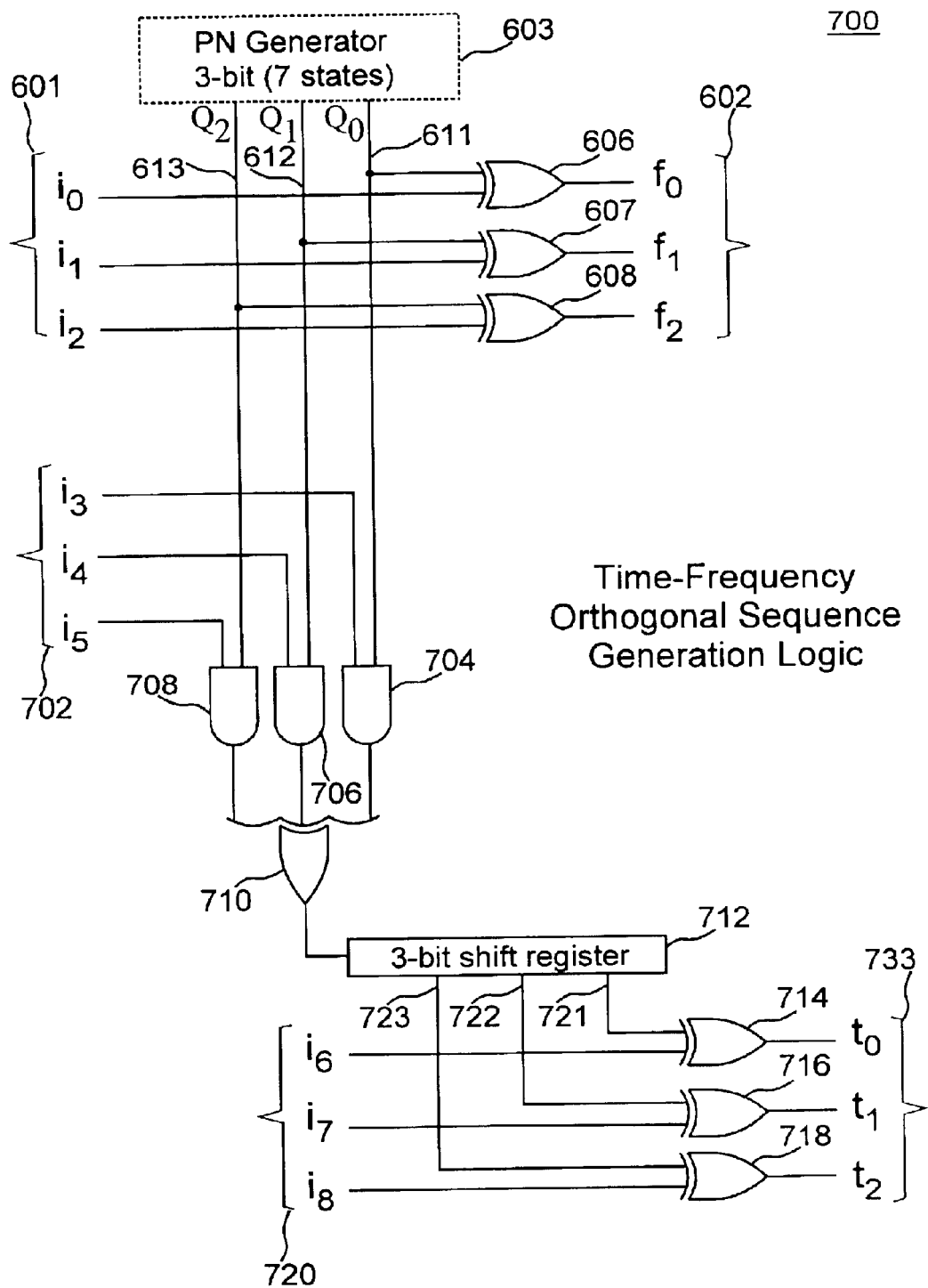
FIG. 7 is a diagram of a PN generator used to affect the frequency and timing changes in the remote telemetry transmitters and in the telemetry collection receiver according to an advantageous embodiment of the present invention.

Referring to FIG. 7, the frequency index is produced by the PN generator 603 outputs 613, 612 and 611 and transmitter ID bits 601—$\{i_2, i_1, i_0\}$ processed with EXOR gates 608, 607, and 606 to produce index digits 602—$\{f_2, f_1, f_0\}$ as described previously in conjunction with FIG. 6. The PN generator output is further processed with transmitter ID digits 702—$\{i_5, i_4, i_3\}$ by the AND gates 708, 706 and 704 and by an EXOR gate 710. The output of the gate 710 taken one bit at the time is a shifted replica of the output of the PN generator e.g. output 611 or 612 or 613, whose relative shift depends on the transmitter ID digits 702. The output of the gate 710 is then fed to a shift register 712 whose outputs 723, 722 and 721 are shifted replicas of the PN generator outputs 713, 712, and 711 respectively. When taken three digits at the time, the sequence produced at the output of the shift register is a shifted replica of the output of the PN generator. For example, if the PN sequence produced is order $\{7, 3, 5, 2, 1, 4, 6\}$, and bits $\{i_5, i_4, i_3\}$ are 011 then the shifted sequence is $\{4, 6, 7, 3, 5, 2, 1\}$; if the bits $\{i_5, i_4, i_3\}$ are 101 then the shifted sequence is $\{2, 1, 4, 6, 7, 3, 5\}$. This way, a total of 7 shifted sequences are produced (000 input is not allowed). The shifted sequences are further processed with bits 318—$(i_8, i_7, i_6)$ of the transmitter ID by EXOR gates 718, 716, and 716 to produce permutations of the shifted sequences at the outputs 733—$\{t_2, t_1, t_0\}$ in a manner similar to the previously described in conjunction with frequency index generation. This way, each shifted sequence can be permuted in 8 different ways creating total 7*8=56 shifted-permuted sequences. The shifted and permuted sequences are used to produce variations of the time between consecutive transmissions. In the illustrative embodiment, the numbers from a sequence are multiplied by a $\Delta T=TBT/P$ and added to the nominal time between transmission. Where, TBT is the nominal time between transmission and P is an arbitrary but rather large integer number. Advantageously P is a power of 2.

If the permuted PN sequences are used as frequency indexes and the shifted-permuted sequences are used to randomize the time between transmission, then there are created 8*7*8=448 sequences that are time-frequency orthogonal in the sense that if two sequences coincide at one frequency and time, they will not coincide for any other frequency and time for the entire PN generator period. This is based on merely 3-bit generator of the illustrative example! Of course, if a longer shift register is used for the PN generator, a far greater number of sequences are created. In the illustrative embodiment, an 8-bit generator is used as described previously. This results in over 16E6 orthogonal time-frequency sequences. Enough to relieve the manufacturer and applications from transmitter ID code management other than sequential numbering of all manufactured transmitters. Of course, for a 8 bits shift register, 8 bits of the transmitter ID code are used to obtain sequence permutation for frequency index, similarly, 8 bits are used for shifting and another 8 bits for permuting the shifted sequence to obtain the time delay variations.

One advantage of this method is that in addition to two apparent dimensions of variability present in the form of permutations of frequency and time sequences, there is a third dimension added: i.e. the phase relationship variability between the frequency and time sequences. This rapidly increases a number of distinct orthogonal frequency-time sequences with increasing length of the basic PN generator as evidenced by the illustrative example. While it is possible to use other kinds of basic sequence and to use other ways of transforming the numbers of the basic sequence to obtain new sequences, the added new dimension has several advantages as evidenced in the illustrative embodiment.

The permutation process as described is an example of a more general process of transformation that transforms a set of numbers into another set of numbers (that may differ in size). It should be apparent that although a transformation resulting in the permutation as described is advantageous, other transformations may be used to derive frequency-time pattern based on the described principle. It should also be apparent that in some implementations the order in which the shift and the second transformation (permutation) is performed may be reversed without altering the essence of the method.

Another advantage of the illustrative embodiment is that the permutations and shifting of the sequences can be performed by processing (transforming) one number of the sequence at the time, thus eliminating the need to store and manipulate the entire sequence. I.e., the permuted or shifted sequence numbers are produced one at the time as needed based on numbers from the basic sequence that are also produced one at the time as needed.

Note that this advantageous way of producing the frequencies does not require any overhead in the transmitted messages for the synchronization purpose. This is because the receiver can instantly recover the PN generator status based on just a single received message if the transmitter ID code is known. As described previously, the receiver can infer the status of the 8-bit generator based on the received frequency index and the transmitter ID code. I.e. the message contains the information about the 8-bit generator without explicit inclusion of the generator status bits in the message. In the illustrative embodiment, after the frequency index is obtained for a transmission, the time index is obtained by filling the shift register in the steps of storing the PN generator status, clocking the PN generator and shift register N times, and restoring PN generator status. This way, the content of the shift register 712 is not required by the receiver to obtain synchronization because the time index depends on the future content of the PN generator that can be easily duplicated in the receiver based on the present content. Therefore, the receiver can still synchronize with a transmitter based on one received message and the message does not need to include any overhead for synchronization.

Similarly, the process of selecting the segments of the transmitter ID code can be based on the status of the PN generator, thus making it easy to identify by the receiver which segment is included without including additional bits in the transmitted messages. For example, the transmitter can select consecutive segments of the ID code cyclically at each increment of the PN generator starting form a predetermined state and predetermined segment.

In an alternative implementation, a second PN generator synchronized with the first PN generator may be used to produce the time variations wherein an information about the second generator phase may be included in the transmitted message to aid the synchronization. Equivalently, the receiver may compute the state of the second generator, based on the state of the first. Note, that synchronization of the first and the second generator in the transmitter is extremely important since the essence of the idea is that the cyclic shift of the second sequence is provided in respect to the reference provided by the phase of the first sequence. This way the resulting frequency-time hopping sequences produced in different transmitters are ensured to be distinct and orthogonal.

Although, the described implementation based on a single generator is advantageous since it results in a simpler implementation and lower overhead leading to a longer battery life, the two generator implementation can be modified to ensure low overhead and provide additional benefits as follows.

Both, first and second PN generators produce basic sequences whose length is $2^N-1$ and $2^M-1$, wherein N and M are the lengths of the respective shift registers in both generators. In order to provide for synchronization between both sequences, each sequence is extended by one bit by inserting one "0" bit at a predetermined place in the sequence. The advantageous place is after N-1 or M-1 "0" bits in the respective sequences. This way the lengths become $2^N$ and $2^M$ respectively which ensures that both sequence lengths are related by a power of 2 (i.e. 2, 4, 8, etc.). Now, it is possible to ensure that both sequences are always in the same phase relation; e.g. after initial reset, which sets the generators in a predetermined state, both generators are advanced at the same time. This way, they will return to the exact initial state after the full period of the longer sequence. Of the particular interest is the case of the time generator producing a longer sequence than the frequency generator. In some applications, there is a limited number of frequency channels available, however there is still a need to produce a large number of frequency-time orthogonal sequences. In such case, a longer time sequence can be used to expand the number of possible frequency-time sequences. For example if the frequency generator shift register has N bits and the time generator shift register has M bits, then the total number of sequences is $2^N*(2^M-1)*2^M$ as shown in the preceding examples. Each time M is increased by one, the number of frequency-time sequences is enlarged approximately by a factor of four resulting in a rapid increase of the number of sequences with the increase of the time generator shift register length. Also, the synchronization requires a small overhead because the receiver can infer the frequency generator state and needs only the state of the time generator. However, if the time generator is in precise phase lock with the frequency generator, the transmitter does not need to send the actual time generator state. Instead, the transmitter needs to include the information to remove the uncertainty created by the time sequence period being multiple of the frequency sequence period. E.g., if the time sequence is two times longer, the receiver needs to know if the time generator is in the first half or the second half of the sequence to determine the exact state of the time generator. In this particular case, this information requires only one bit to be included in the transmitted messages. Of course, more bits are required if the time sequence is longer, e.g. if the time sequence is 4 times longer than the frequency sequence, two bits are required; for 8 times longer sequence 3 bits are needed, etc.

The described method (with one or two generators) produce a large number of time-frequency orthogonal sequences in a simple and systematic way that enables the sequence selection by the transmitter ID and requires zero (or very small) overhead for synchronization. A system using a large number of time-frequency orthogonal sequences as described has an advantage of immunity to multipath fading, pulsed and frequency selective interference including intentional jamming, as well as low probability of self interference due to persistent collisions that may occur when two or more transmitters transmit messages on the same frequency and at the same time for a prolonged period. A large number of produced frequencies enables the manufacturer and the system operators not to be concerned with the management of sequences for all the transmitters. Instead, each manufactured transmitter can produce a unique sequence that can be easily replicated in the receiver based just on the transmitter ID code.

It is to be understood that the random frequency selection as described above and the time perturbation can be used together or in separation to achieve immunity to collisions. Such obtained frequency-time hopping sequence may be in any combination of time and frequency variability, including: (a) a fixed frequency pattern for all transmitters and individual time perturbation patterns for each transmitter, (b) a fixed time interval between transmission or fixed time perturbation pattern and individual pattern for frequency selection for each transmitter, and (c) individual frequency and time variations that can be combined to enhance the system performance at the expense of complication.

In an advantageous embodiment, both the transmission frequency and the time interval between transmissions are individually randomized for each transmitter by the transmitter ID code bits.

It is also to be understood that the illustrated method and its components such as generators, registers, gates, etc., can be realized in various forms of hardware some of which may include ASIC, or software, or their combination.

Figure 5:
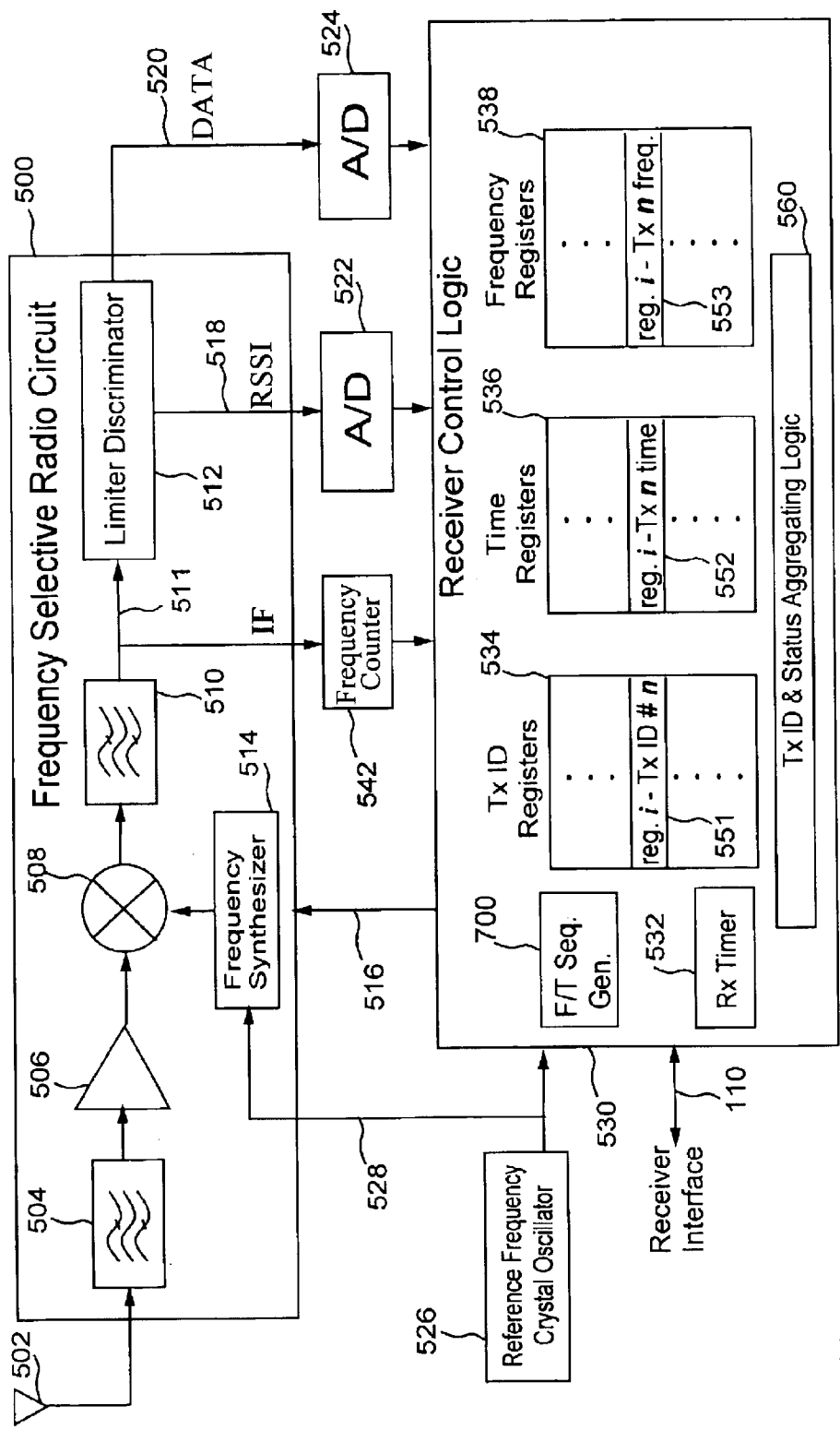
FIG. 5 is a diagram of a telemetry collection receiver according to an advantageous embodiment of the present invention.

Referring to FIG. 5, the telemetry collection receiver (receiver) includes a reference frequency crystal oscillator 526 to produce a stable reference frequency on line 528 for the receiver circuits, a frequency selective radio receiver circuit 500 whose frequency is programmable via lines 516, to receive and demodulate a frequency modulated carrier when the frequency of the frequency selective receiver circuit is programmed according to the frequency of the carrier, and a receiver control logic means 530 to process demodulated data, to provide receiver interface lines 110, responsive to the received data, and to program the frequency of the frequency selective receiver circuit. The control logic includes a receiver timer 532 establishing a time base to measure the elapsing time. The control logic also includes: (a) a plurality of identification memory registers 534 to hold digital data indicative of identification numbers for each remote telemetry transmitter that belongs to the system, (b) a plurality of time memory registers 536 to hold digital data indicative of the time of the next transmission occurrence for each respective remote telemetry transmitter, and (c) a plurality of frequency memory registers 538 to hold digital data indicative of the frequency of the next transmission occurrence for each respective remote telemetry transmitter. In the illustrative embodiment, the registers are organized such that if an arbitrary register i 551 of the plurality of identification memory register 534 contains a transmitter identification number n, then register i 552 of the plurality of time memory registers 536, and register i 553 of the plurality of frequency memory registers 538 are also associated with the same transmitter whose identification number is n. The frequency selective radio receiver circuit 500 includes a RF band-pass filter 504, an amplifier 506, an IF band-pass filter 510, a mixer 508, limiter-discriminator circuit 512 and frequency synthesizer 514. The RF band-pass filter selects only the desired frequency band allocated for the transmission, the mixer mixes the incoming signal with the signal produced in the frequency synthesizer and produces an IF frequency (Intermediate Frequency). The IF frequency is filtered in a narrow band filter 510 whose bandwidth is selected according to the channel bandwidth. The limiter discriminator demodulates the signal and produces base-band DATA signal 520 and an RSSI signal 518 indicative of the received signal strength. The DATA signal 520 and the RSSI signal 518 are converted to binary signals by A/D converters 524 and 522 respectively and fed to the control logic 530. The presented architecture of the frequency selective radio receiver circuit 500 is known as a super-heterodyne FM receiver; it is well known and it does not require additional explanation. The transmitted message data is extracted from the DATA signal 520 digitized by the A/D converter 524 using one of the many well-known methods for signal processing and does not require additional explanation.

In the advantageous embodiment, the frequency registers 538 hold, for each transmitter, the state of PN generator. If the synchronization is obtained with a given transmitter, the state of the PN generator is identical with that in the transmitter.

In the advantageous embodiment, the time registers 536 hold numbers—time of next transmission—for each transmitter representing the state of the receiver timer 532 at the time the next transmission is due from a transmitter.

In operation, the receiver control logic 530 sequentially compares the data content of the time registers 536 with the data content of the receiver timer 532 and if the transmission is due from a remote telemetry transmitter n whose time data is stored in register i 552, the control logic programs the frequency selective radio receiver circuit 500 according to the content of the frequency register i 553 and the identification register i 551 that are associated with the same transmitter n, attempts to decode the demodulated signal, changes the content of the time register based on the number representative of the time interval between the transmissions for this transmitter and changes the content of the frequency register according to a predetermined algorithm for this transmitter. I.e. the frequency and the time registers are updated each time a transmission is due regardless whether the transmission was received successfully. The new content of the frequency register is determined according to the algorithm for the frequency use by the transmitters.

Nominally, the time between transmission—TBT—is the same for all remote telemetry transmitters but due to unavoidable tolerances and temperature variations, the TBT may be slightly different for different transmitters and it can vary with time. Therefore, the new content of the time register is calculated based on the current content of the receiver timer and a number representative of the time between the current transmission and the next transmission for this transmitter, where this number is calculated based on the nominal value of the time between the transmissions and adjusted by a correction factor that is based on the measured difference between the transmitter time base and the time base of the receiver. The difference is computed based on the difference between the measured TBT for a transmitter and the nominal value of TBT by measuring the time of arrival of the transmissions at the receiver and comparing to the scheduled time of arrival. In the advantageous embodiment, the numbers representative of the time base differences are stored in the time registers 536 separately for each remote telemetry transmitter and are independent from the numbers representing the time of the next transmission, i.e. the time registers are split to hold two independent numbers. In addition, the difference between the transmitter time base and the receiver time base can be computed based on the measurement provided by the frequency counter 542. Since the time between transmissions and the carrier frequency are derived from the same reference source in both the receiver and all the transmitters, the relative carrier frequency error can be used to compute the time error even in advance of the next transmission.

According to another advantageous embodiment of the present invention, the receiver ability to synchronize and track a plurality of transmitters, each of which transmitting using unique frequency-time hopping sequence, is used to further reduce the transmission overhead. The receiver discerns the source of a transmission based on the time and frequency of the transmission. In operation, the receiver is furnished a list of ID codes for all transmitter to be monitored (or ID codes and associated sequence selecting numbers). Thus, the receiver can replicate the hopping patterns of each transmitter. Once synchronized, the receiver continuously tunes to the right frequency at the right time to receiver each transmission from each receiver. Without any ID code bits in the transmitted messages, the confusion can occur only if two or more transmitters happen to transmit at the same time and at the same frequency. Since the messages are sporadic and short, this happen rarely. Furthermore, since the frequency-time hopping sequences are orthogonal, prolonged coincidence is prevented. Therefore, in these rare instances the message can be ignored without impacting system operation. Thus, the receiver and the system can operate correctly, and the source of each transmission can be identified without any bits of the transmitter ID codes included in the transmitted messages.

At this point it is necessary to explain how the receiver acquisition can work in spite of the uncertainty of the time and frequency for the next transmission. On the surface, this seems to be a daunting task since, the transmission frequency (and time) changes are unique for each transmitter an dependent on the transmitter ID code, but the transmitted message does not include the transmitter ID code. In addition, the transmitted message does not include the state of the sequence generator to minimize the message length. The following method is used in the receiver to overcome this problem.

The receiver is furnished with a list of the ID codes of all the transmitters to be monitored. Based on the list, the receiver can replicate the frequency-time hopping sequence for each transmitter. However, in order to receive correctly messages transmitted by a transmitter, the receiver must synchronize the replicated sequence with this transmitter. In accordance with the frequency-time hoping sequence generation method described earlier, each sequence has the property that each frequency repeats only once in the entire sequence. In addition, the time hopping (if present) is tied to the frequency hopping, so that knowing the phase of the frequency hopping sequence is sufficient to determine the phase of the time sequence. In fact, in accordance with a preferred implementation of the method, the frequency and time hopping are determined based on the same PN generator. Furthermore, the frequency-time hopping sequence determination is based on processing the output of the PN generator with the transmitter ID code using reversible EX-OR operation. I.e., knowing the current state of the PN generator, the next frequency can be determined. Conversely, knowing the frequency of the received message, the state of the PN generator can be determined. Therefore, in order to synchronize with a transmitter, it is sufficient for the receiver to receive just a single message from this transmitter. However, during the initial acquisition, when the receiver incidentally receives a message while it is randomly searching frequency-time space, in the absence of the transmitter ID code in the transmitted messages, the receiver cannot know which transmitter was the source of the message. Suppose that the receiver has two transmitters on the list that it is not tracking yet. (We can say, for brevity, that the transmitters are not "in-sync"). Suppose that the receiver incidentally received a message from one of them, i.e., the receiver received a message that is not at the expected time and frequency for all the other transmitter that the receiver is presently tracking. The receiver can, temporarily, assume that it is synchronized with both transmitters and attempt to track both of them. I.e., the receiver can tune to the next transmission frequency at the appropriate time for each of the transmitters. (There is no problem with this since the frequency-time sequences are orthogonal and, consequently, the expected transmissions from both transmissions do not coincide in time and frequency.) Obviously, the receiver will receive messages from only one of them. Once at least one additional message is received, the receiver immediately knows which transmitter is in-sync. The other transmitter can be declared to be not in-sync and in need to further search for its transmissions. Applying this method successively (or even in parallel), the synchronization may be obtained with an arbitrary number of transmitters.

Consequently, it should be apparent that the presented method of frequency-time hopping, in conjunction with the operation of the receiver allows it to discern any transmitter among other transmitters based on the transmission time and frequency and without any additional information embedded in the transmitted messages. This is advantageous in reducing the transmission overhead and conserving the average power consumption in the transmitters.

A variation of this method is based on including a part of transmitter ID or entire or part of the state of the frequency-time sequence generator in the transmitted message. Although, in most cases this is not necessary, it may be beneficial in simplifying the receiver operation. For example, if the time hopping is accomplished with a separate and longer PN generator than that used for the frequency hopping (as described earlier), then the additional information that indicates coarse phase of the time PN generator may be included in the messages in order to simplify the resolution of the ambiguity resulting from different lengths of the two generators.

In conclusion, the described method allows the initial acquisition to occur without the transmitter ID code and without the PN generator state included in the messages. Such acquisition is even more robust than in a case when the entire transmitter ID is included. The reason for this is that in the latter case the receiver needs to receive correctly all the bits of the transmitter ID for successful acquisition to occur, and in the former case, this is not necessary.

To summarize, in general, the reduction of the overhead for the transmitter ID code can be accomplished by including portions of ID code in the transmitted messages. The receiver can then aggregate the portions based on the expected and actual time of each transmission. This can be accomplished regardless of whether the system uses unique hopping patterns for each transmitter or not.

In a more particular case in which a frequency or time hopping is used where each transmitter uses different hopping pattern, or in which, preferably, frequency-time hopping is used where each transmitter uses different hopping pattern, the reduction of the overhead can be complete. I.e., no transmitter ID code bits are included in the message because the process of identifying each transmitter is based on its unique hopping pattern.

It should be apparent for the skilled in the art that although the illustrative embodiment of the present invention has been described in a case where each transmitter transmits one carrier frequency at a time, this does not have to be always the case. Advantageously, each transmitter may produce more than one carrier at the time, where the frequency for all carriers may be varied based on the same sequence or some carriers may be affected by different sequence than the other carriers. Advantageously, in some cases, the carriers may be related to each other by a fixed frequency offset.

In the illustrative embodiment described here, references are made to several elements such as generators, logic, registers, control operations, etc. It is to be understood that various elements described here can be realized in several different forms including software and hardware in their various forms and combinations. E.g. "logic" can be in a form of hardware such as a gate or memory element, or it can be a part of software or hardware or a combination of both such as implemented in e.g., a microprocessor or application specific integrated circuit (ASIC). In the most general way, logic can be simply understood as "intelligence", i.e., ability to perform certain computing (or computer) functions.

For the purpose of this specification, the receiver control operation can be performed by one or more dedicated or shared logic that may include or be a part of a microprocessor or any other computing devices, e.g. personal computer that may be integrated or external or even remote. Insofar as the functions performed by a logic or microprocessor or computing devices relate to the operation of the receiver they are considered a part of the receiver for the purpose of this specification. The same claim is made for all the transmitter functions.

For the purpose of this application, wherever references are made such as "first logic" or a "second logic", etc., or otherwise labeled logic, it is to be understood that such "first logic" and "second logic", etc., or otherwise labeled logic can be implemented as physically separate or as contained in the same structure (hardware, e.g. ASIC, or software, e.g. microprocessor memory, or a combination of both) or they can be partially overlapping. In some cases a single logic can be partitioned and implemented in more than one structure, e.g., a receiver control logic can be partially in a telemetry collection receiver and partially in a separate computer communicating with the receiver where the computer may even be not co-located with the receiver.

Finally, for the purpose of this specification, "a telemetry system" is any system used for collecting data from one or more transmitters by one or more receivers, where the collected data may be of any nature as required by a variety of telemetry applications, which includes but is not restricted to: security, burglary alarms, fire alarms, temperature control, utility meters, leak sensing, environmental monitoring, plant monitoring and control, etc. It may also include sensing user input, e.g. pressing panic button, etc. Accordingly, a "remote telemetry transmitter" and "telemetry collection receiver" are parts of such telemetry system.

Although illustrative embodiments of the invention have been described in detail herein with reference to the accompanying drawings, it is to be understood that the above-described embodiments are merely illustrative of the invention, and that the invention is not limited to those precise embodiments, and that many variations may be devised by one skilled in the art without departing from the scope and spirit of the invention. It is therefore intended that such variations be included within the scope of the invention as defined by the appended claims.

What is claimed is:

1. A system comprising:

a plurality of transmitters each of which, when operative, transmits independently of any other of said plurality of transmitters and independently of any equipment for receiving from any of said plurality of transmitters, and includes, in transmitters, less than an entire transmitter identification; and a receiver for:

(a) holding, simultaneously for each plurality of transmitters, data indicative of an expected time and an expected frequency of at least one future transmission, wherein each said plurality of transmission is transmitted by different one of said plurality of transmitters, and wherein, transmission frequency and time between transmission are controlled according to a time-frequency pattern that is different for each of said plurality of transmitters; and (b) identifying at least one of said plurality of transmitters based on said time-frequency pattern.

2. The system of claim 1 wherein each said plurality of transmission is devoid of bits of a transmitter identification.

3. The system of claim 1 wherein, in at least one said plurality of transmission, portions of a status are included in various transmissions.

4. The system of claim 1 wherein, in at least one said plurality of transmissions, portions of a transmitter identification are included in various transmissions.

5. The system of claim 4 wherein said portions are selected based on said time-frequency pattern.

6. The system of claim 4 wherein said receiver is further for aggregating said portions.

7. A method comprising:

transmitting by each of a plurality of transmitter independently of any equipment for receiving from any of said plurality of transmitters and independently of any other of said plurality of transmitters, and including, in a plurality of transmission, less than an entire transmitter identification; and holding, in a receiver, simultaneously for each plurality of transmissions, data indicative of an expected time and an expected frequency of at least one future transmission, wherein each said plurality of transmission is transmitted by difference one of said plurality of transmitters, and wherein; transmission frequency and time between transmission are controlled according to a time-frequency pattern that is different for each of said plurality of transmitters; and identifying at least one of said plurality of transmitters based on said time-frequency pattern.

8. The method of claim 7 wherein each said plurality of transmission is devoid of bits of a transmitter identification.

9. The method of claim 7 wherein, in at least one said plurality of transmissions, portions of a status are included in various transmissions.

10. The method of claim 7 wherein, in at least one said plurality of transmission, portions of a transmitter identification are included in various transmissions.

11. The method of claim 10 wherein said portions are selected based on said time-frequency pattern.

12. The method of claim 10 wherein said receiver is further for aggregating said portions.

13. A receiver comprising:

logic for holding, simultaneously for each plurality of transmissions, data indicative of an expected time and an expected frequency of at least one future transmission, wherein each said plurality of transmissions is transmitted by different one of a plurality of transmitters, and wherein each of said plurality of transmitters, when operative, transmits independently of any other of said plurality of transmitters and independently of any equipment for receiving from any of said plurality of transmitters, and wherein, transmission frequency and time between transmissions are controlled according to a time-frequency pattern that is different for each of said plurality of transmitters; and logic for identifying at least one of said plurality of transmitters on said time-frequency pattern.

14. The receiver of claim 13 wherein said receiver is enabled to aggregate parts of status embedded in various transmissions of at least one of said plurality of transmissions.

15. The receiver of claim 13 wherein said aggregation is based on said time-frequency pattern.

16. A plurality of telemetry transmitters, each of which comprises:

a circuit for transmitting intermittently, at various transmission frequencies, independently of any other of said plurality of transmitters, and independently of any apparatus for receiving from any of said plurality of transmitters; and logic for controlling transmission frequency and time between transmissions according to a frequency-time pattern that is different for each of said plurality of transmitters;

wherein, in operation, each of a plurality of transmissions comprises less than an entire transmitter identification.

17. The plurality of telemetry transmitters of claim 16 wherein each of a plurality of transmissions is devoid of bits of a transmitter identification.

18. The plurality of telemetry transmitters of claim 16 wherein portions of a status are included in various transmissions.

19. The plurality of telemetry transmitters of claim 16 wherein portions of a transmitter identification are included in various transmissions.

20. The plurality of telemetry transmitters of claim 19 wherein said portions are selected based on said time-frequency pattern.

21. A telemetry transmitter comprising:

a circuit that, in operation, transmits intermittently transmissions, at various transmission frequencies, independently of any apparatus for receiving any of said transmissions, and logic for controlling transmission frequency and time between transmissions based on a predetermined frequency-time pattern dependent on a transmitter identification code or a number associated with said identification code, wherein each of a plurality of said transmission comprises less than the entire said transmitter identification code.

22. The telemetry transmitter of claim 21 wherein each of the plurality of said transmission is devoid of bits of said transmitter identification code.

23. The telemetry transmitter of claim 21 wherein, portions of a status are included in various transmissions.

24. The telemetry transmitter of claim 23 wherein said portions are selected based on said time-frequency pattern.

* * * * *